(12) United States Patent
Ji et al.

(10) Patent No.: US 9,405,320 B1
(45) Date of Patent: Aug. 2, 2016

(54) ELECTRONIC DEVICE DOCKING STATION AND BASE ASSEMBLY

(71) Applicant: ShenZhen Goldsun Network Intelligence Technology Co., Ltd., ShenZhen (CN)

(72) Inventors: Hai-Yi Ji, Wuhan (CN); Zhi-Yong Gao, Wuhan (CN); Yu-Lin Liu, Wuhan (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 0 days.

(21) Appl. No.: 14/683,890

(22) Filed: Apr. 10, 2015

(30) Foreign Application Priority Data

Jan. 28, 2015 (CN) .......................... 2015 1 0042730

(51) Int. Cl.
  *G06F 1/16* (2006.01)
  *G06F 3/02* (2006.01)

(52) U.S. Cl.
  CPC ............ *G06F 1/1632* (2013.01); *G06F 1/1633* (2013.01); *G06F 3/0202* (2013.01)

(58) Field of Classification Search
  CPC ..... G06F 1/1632; G06F 16/26; G06F 1/1656; G06F 1/1616; G06F 1/1654; G06F 1/1679; G06F 1/1681; G06F 1/1662; G06F 1/1671; G06F 1/1633; G06F 1/1637; G06F 3/0202; G06F 3/0231; G06F 1/16; G06F 1/169; G06F 1/1601; G06F 1/1613; G06F 1/1622; G06F 1/1624; G06F 1/1628; H05K 7/00; H05K 7/16
  USPC ............. 361/679.08, 679.11–679.17, 679.41; 400/472–496; 341/22–33; 345/168–172
  See application file for complete search history.

(56) References Cited

U.S. PATENT DOCUMENTS

2014/0098485 A1*   4/2014   Vahid ................... G06F 1/1632
                                                                  361/679.41

* cited by examiner

*Primary Examiner* — Jinhee Lee
*Assistant Examiner* — Ingrid Wright
(74) *Attorney, Agent, or Firm* — ScienBiziP, P.C.

(57) ABSTRACT

An electronic device docking station is used to support an electronic device. The electronic device docking station includes a main portion and a keyboard. The main portion is rotatably connected to the keyboard. The main portion defines a receiving space and a receiving groove. The electronic device is received in the receiving groove. The keyboard can rotate between a closed position and a working position. When the keyboard is in the closed position, the keyboard is received in the receiving space. When the keyboard is in the working position, the keyboard and the main portion are substantially aligned in a plane. A base assembly is also provided.

19 Claims, 4 Drawing Sheets

ELECTRONIC DEVICE DOCKING STATION AND BASE ASSEMBLY

CROSS-REFERENCE TO RELATED APPLICATIONS

This application claims priority to Chinese Patent Application No. 201510042730.2 filed on Jan. 28, 2015, the contents of which are incorporated by reference herein.

FIELD

The subject matter herein generally relates to an electronic device docking station and a base assembly.

BACKGROUND

The tablet computer is widely used in everyday life. The tablet computer can be located on a base with a keyboard to form a laptop computer.

BRIEF DESCRIPTION OF THE DRAWINGS

Implementations of the present technology will now be described, by way of example only, with reference to the attached figures.

DETAILED DESCRIPTION

Figure 1:
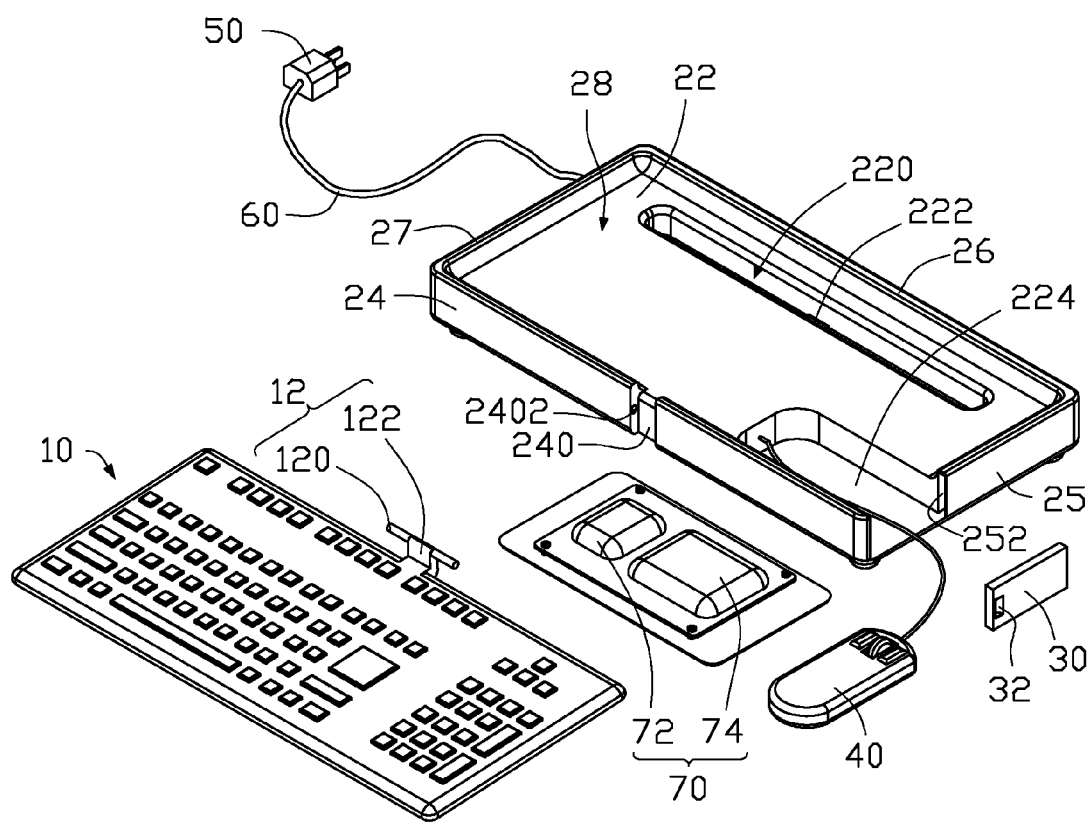
FIG. 1 is an exploded, isometric view of one embodiment of an electronic device docking station.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to an electronic device docking station.

Figure 2:
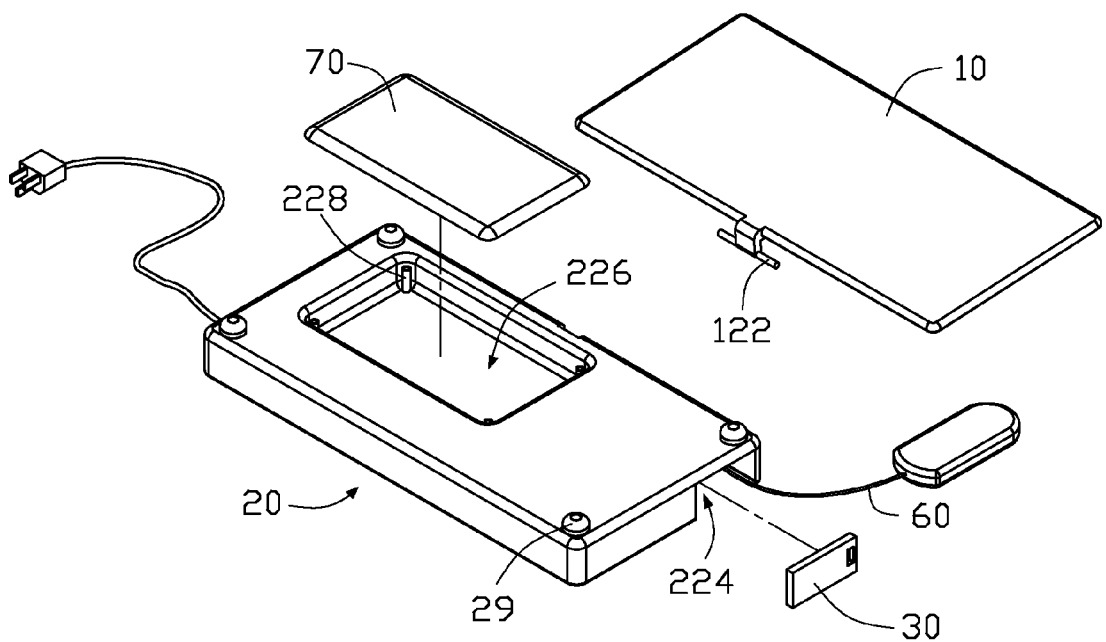
FIG. 2 is similar to FIG. 1, but viewed from another angle.

FIGS. 1-2 illustrate one embodiment of an electronic device docking station 100. The base includes a keyboard 10, a main portion 20, and a stopper block 30, a mouse 40, a plug 50, two connecting lines 60 and an expending member 70.

The keyboard 10 includes a rotating portion 12. The rotating portion 12 includes an extending portion 120 and two shafts 122. The two shafts 122 extend from two sides of the extending portion 120.

The main portion 20 includes a body 22, a first side 24, a second side 25, a third side 26, a fourth side 27, and four sporting portions 29. The body 22, the first side 24, the second side 25, the third side 26 and the fourth side 27 cooperatively define a receiving space 28. The body 22 defines a receiving groove 220, an opening 224 and a mounting portion 226. The receiving groove 220, the opening 224 and the mounting portion 226 are formed by a recess of the body 22. The receiving groove 220 and the opening 224 are defined in one side of the body 22. The mounting portion 226 is defined in another side of the body 22. The four sporting portions 29 extend from the side of the body 22 defining the mounting portion 226. The receiving groove 220 is defined in an edge of the body 22. The opening 224 is defined in one end of the body 22 and communicates externally. The body 22 further includes an inserting portion 222 and four posts 228. The inserting portion 222 is located in the receiving groove 220. The four posts 228 are located in four corners of the mounting portion 226. The first side 24 defines a connecting portion 240. The connecting portion 240 defines two connecting holes 2402. The second side 25 defines an inserting groove 252. In at least one embodiment, the four sporting portions 29 can include elastic material to prevent from damage from the base.

The stopper block 30 defines an operation hole 32. The expending member 70 includes a power supply 72 and a wireless router 74.

Figure 3:
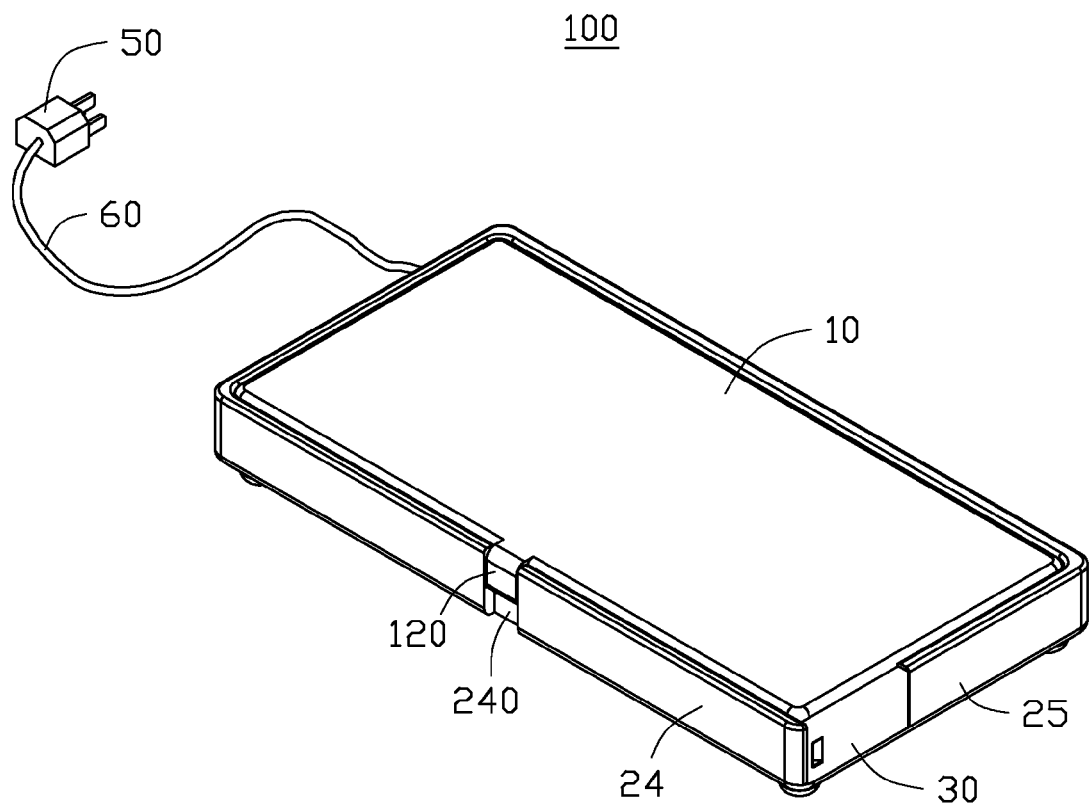
FIG. 3 is an assembled, isometric view of the electronic device docking station of FIG. 1.
Figure 4:
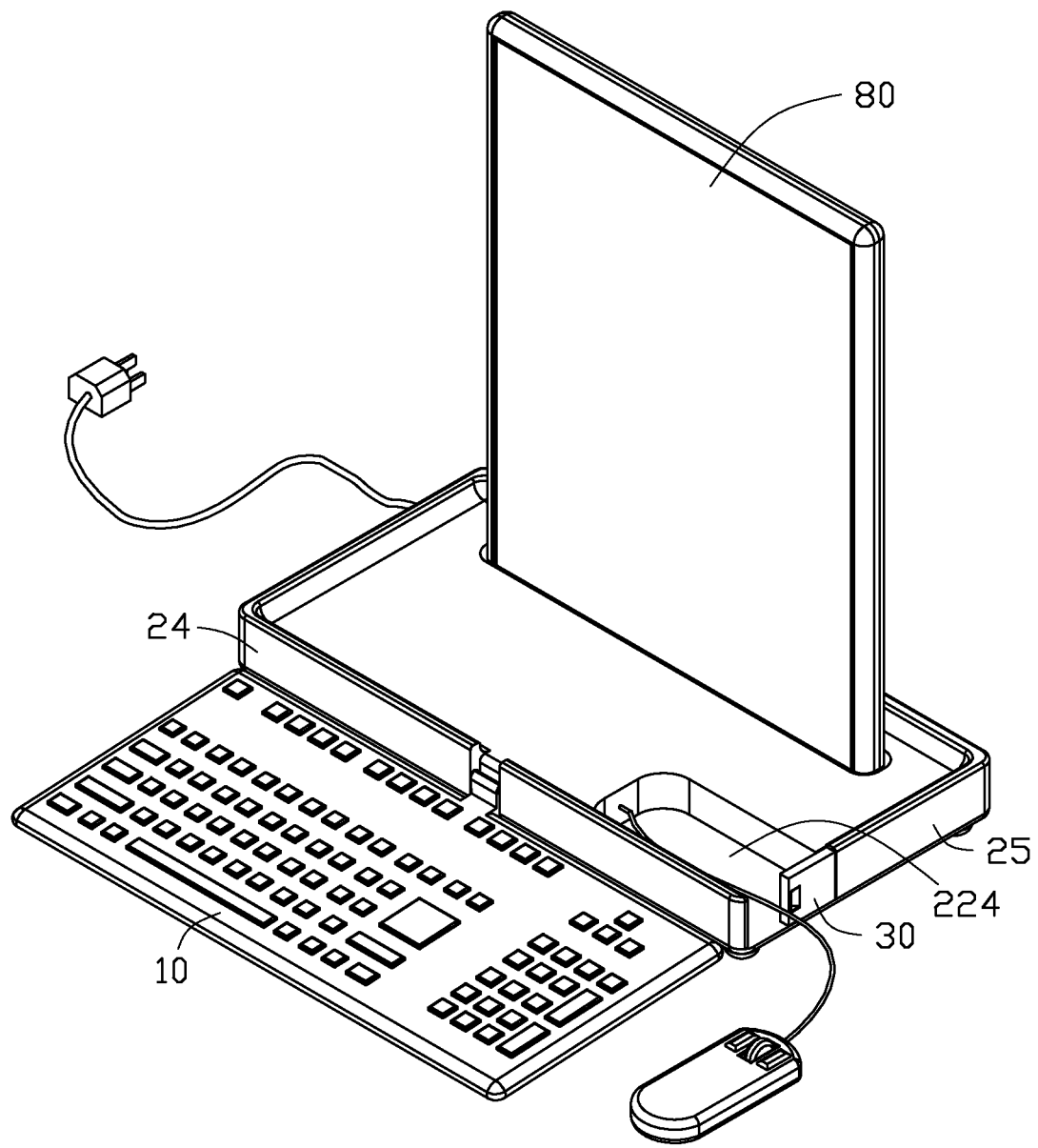
FIG. 4 is similar to FIG. 3, but in a working state.

FIGS. 3-4 illustrate assembled views of the electronic device docking station of FIG. 1. When the electronic device docking station 100 is assembled, one of the two connecting lines 60 connects to the plug 50 and the main portion 20. Another connecting line 60 connects to the mouse 40 and the main portion 20 (as shown in FIG. 2). The mouse 40 can be located in the opening 224. The stopper block 30 is engaged with the inserting groove 252 (as shown in FIG. 1). The stopper block 30 abuts with the first side 24 to prevent the mouse 40 from moving from the opening 224. The expending member 70 (as shown in FIG. 2) is received in the mounting portion 226 (as shown in FIG. 2). A plurality of screws (not shown) is engaged with the four posts 228 (as shown in FIG. 2) to fix the expending member 70 to the main portion 20. The two shafts 122 (as shown in FIG. 1) are engaged with the two connecting holes 2402. The keyboard 10 is rotatably connected to the main portion 20. The keyboard 10 can be received in the receiving space 28. The keyboard 10 covers the receiving groove 220 (as shown in FIG. 1). The receiving space 28 is in a closed position.

When the electronic device docking station 100 is in use, the base 10 is located on a plane. The keyboard 10 is forced to rotate around the two shafts 122 until the keyboard 10 is on a level plane and in a working position. The stopper block 30 moves away from the first side 24. The opening 224 communicates with the external. The mouse 40 is removed from the opening 224. An electronic device 80 is engaged with the inserting portion 222 and is received in the receiving groove 220.

The embodiments shown and described above are only examples. Many details are often found in the art such as the other features of an electronic device docking station. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device docking station comprising:
    a main portion defining a receiving space and a receiving groove, the receiving groove being configured to receive an electronic device; and
    a keyboard;
    wherein the keyboard is rotatably connected to the main portion, the keyboard is configured to rotate between a close position and a using position, when the keyboard is in the close position, the keyboard is received in the receiving space; and when the keyboard is in the using position, the keyboard is moved out of the receiving space and substantially aligned in a plane with the main portion.

2. The electronic device docking station of claim 1, wherein when the keyboard is in the close position, the keyboard covers the receiving groove; and when the keyboard is in the using position, the receiving groove is shown from the receiving space.

3. The electronic device docking station of claim 1, wherein the main portion comprises a first side, the first side defines two connecting holes, the keyboard comprises two shafts, and the two shafts are engaged with the two connecting holes.

4. The electronic device docking station of claim 1, wherein the main portion comprises an inserting portion, and the inserting portion is located in the receiving groove.

5. The electronic device docking station of claim 1, wherein the base further comprises a mouse, the main portion further defines an opening, and the mouse is received in the opening.

6. The electronic device docking station of claim 5, wherein the base further comprises a stopper block, the main portion comprises a second side, the second side defines an inserting groove, and the stopper block is engaged with the inserting groove.

7. The electronic device docking station of claim 6, wherein the main portion comprises a first side, and when the stopper block moves along a direction away from the first side, the opening communicates with the external.

8. The electronic device docking station of claim 1, wherein the base further comprises an expending member, the main portion defines a mounting portion, and the expending member is received in the mounting portion.

9. The electronic device docking station of claim 8, wherein the main portion comprises a body, and the mounting portion and the receiving space are defined in the two sides of the body.

10. A base assembly comprising:
    an electronic device;
    a main portion defining a receiving space and a receiving groove; and
    a keyboard;
    wherein the receiving groove is configured to receive the electronic device, the keyboard is rotatably connected to the main portion, the keyboard is configured to rotate between a close position and a using position, when the keyboard is in the close position, the keyboard is received in the receiving space; and when the keyboard is in the using position, the keyboard and the main portion are substantially aligned in a plane.

11. The base assembly of claim 10, wherein when the keyboard is in the close position, the keyboard covers the receiving groove; and when the keyboard is in the using position, the receiving groove is shown from the receiving space.

12. The base assembly of claim 10, wherein the main portion comprises a first side, the first side defines two connecting holes, the keyboard comprises two shafts, and the two shafts are engaged with the two connecting holes.

13. The base assembly of claim 10, wherein the main portion comprises an inserting portion, and the inserting portion is located in the receiving groove.

14. The base assembly of claim 10, wherein the base further comprises a mouse, the main portion further defines an opening, and the mouse is received in the opening.

15. The base assembly of claim 14, wherein the base further comprises a stopper block, the main portion comprises a second side, the second side defines a inserting groove, and the stopper block is engaged with the inserting groove.

16. The base assembly of claim 15, wherein the main portion comprises a first side, and when the stopper block moves along a direction away from the first side, the opening communicates with the external.

17. The base assembly of claim 10, wherein the base further comprises an expending member, the main portion defines a mounting portion, and the expending member is received in the mounting portion.

18. The base assembly of claim 17, wherein the main portion comprises a body, and the mounting portion and the receiving space are defined in the two sides of the body.

19. An electronic device docking station comprising:
    a main portion with:
        a bottom surface;
        a top surface opposite to, and substantially parallel with, the bottom surface;
        a front surface substantially perpendicular to the top surface and the bottom surface;
        a back surface opposite to, and substantially parallel with, the front surface and substantially perpendicular with the top surface and the bottom surface;
        a first side surface substantially perpendicular to the top surface, the bottom surface, the front surface and the back surface; and
        a second side opposite to, and substantially parallel with, the first side, and substantially perpendicular to the top surface, the bottom surface, the front surface and the back surface; and
    a keyboard rotatably connected to the main portion;
    wherein, the main portion top surface includes a defined receiving space having a bottom surface opposite to, and substantially parallel with, the main portion bottom surface;
    wherein, the main portion defined receiving space bottom surface includes a receiving groove, the receiving groove being configured to receive an electronic device and the main portion configured to connect with the electronic device when the electronic device is received in the receiving groove; and
    wherein, the keyboard is rotatable from a stored position to a usable position, the keyboard being substantially received into the defined receiving space when in the stored position and being substantially aligned with the main portion bottom surface in the usable position.

* * * * *